Figure 1:
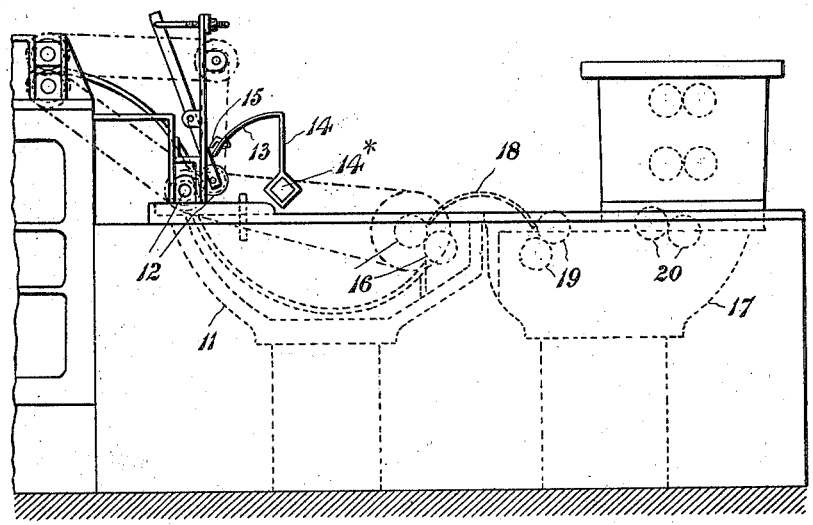

H. S. THOMAS, W. R. DAVIES & R. B. THOMAS.
N. C. B. THOMAS, H. R. W. ANDERSON & C. BATHURST, EXECUTORS OF R. B. THOMAS, DEC'D.
MANUFACTURE OF TIN AND TERNE PLATES AND OTHER LIKE METAL COATED PLATES OR SHEETS AND MACHINERY OR APPARATUS TO BE EMPLOYED IN SAID MANUFACTURE.
APPLICATION FILED MAY 13, 1918.

1,294,970. Patented Feb. 18, 1919.

UNITED STATES PATENT OFFICE.

HUBERT SPENCE THOMAS, OF LLANDAFF, AND WILLIAM ROBERT DAVIES, OF WHIT-CHURCH, NEAR CARDIFF, WALES, AND RICHARD BEAUMONT THOMAS, DECEASED, LATE OF LONDON, ENGLAND, BY NORA CONSTANCE BEAUMONT THOMAS, OF ENGLE-FIELD GREEN, ENGLAND, HENRY ROBERT WILLIAM ANDERSON, OF LONDON, ENGLAND, AND CHARLES BATHURST, OF LYDNEY, ENGLAND, EXECUTORS OF SAID RICHARD BEAUMONT THOMAS, DECEASED.

MANUFACTURE OF TIN AND TERNE PLATES AND OTHER LIKE METAL-COATED PLATES OR SHEETS AND MACHINERY OR APPARATUS TO BE EMPLOYED IN SAID MANUFACTURE.

1,294,970.      Specification of Letters Patent.      Patented Feb. 18, 1919.

Original application filed October 31, 1914, Serial No. 869,666. Divided and application filed May 26, 1917, Serial No. 171,323. Divided and this application filed May 13, 1918. Serial No. 234,301.

*To all whom it may concern:*

Be it known that HUBERT SPENCE THOMAS, a subject of the King of Great Britain, residing at Llandaff, county of Glamorgan, Wales, and WILLIAM ROBERT DAVIES, a subject of the King of Great Britain, residing at Whitchurch, near Cardiff, county of Glamorgan, Wales, and RICHARD BEAUMONT THOMAS, deceased, formerly a subject of the King of Great Britain, and lately residing at London, S. W., England, NORA CONSTANCE BEAUMONT THOMAS, (widow,) HENRY ROBERT WILLIAM ANDERSON, (clerk in holy orders and chaplain to His Majesty's forces,) and Sir CHARLES BATHURST, K. B. E., captain in His Majesty's Army, barrister at law and Member of Parliament, subjects of the King of Great Britain, residing, respectively, at The Glade, Englefield Green, in the county of Surrey, England; 80 Redcliffe Gardens, London, England, and Lydney Park, Lydney, in the county of Gloucester, England, executors of RICHARD BEAUMONT THOMAS,) have invented certain new and useful improvements in the manufacture of tin and terne plates and other like metal-coated plates or sheets and in the machinery or apparatus to be employed in the said manufacture, of which the following is a specification.

The said invention relates to the manufacture of tin and terne plates or sheets and other like metal coated plates or sheets by the use of continuous machinery or apparatus such as is described and represented in the specification of our U. S. application filed May 26th, 1917, Serial No. 171,323.

In order that the present invention may be the better understood we remark that in the said continuous machinery or apparatus hereinbefore referred to the plates or sheets are fed singly into the pickling bath of the machine and are subsequently automatically carried through the swilling, tinning, branning, and dusting appliances of the said machine or apparatus, the said plates or sheets being received or delivered from the rear end of the machine as finished tinned plates or sheets.

The present invention has reference to the tinning apparatus or appliance of the said continuous machine and consists of the improvements hereinafter described relating thereto whereby a very efficient coating of the plates or sheets with tin is insured and at the same time an economy in the use of tin effected.

According to the said invention we carry the wetted plates or sheets through the flux box at the entrance end of the tin pot at a greater speed than through the other parts of the machine or apparatus so as thereby to prevent the undue heating and drying of the plates or sheets before their actual immersion in the molten tin in the tin pot as we have found that thereby an economy is effected in the use of tin.

We will further describe the said invention in connection with the accompanying drawing.

Figure 2:
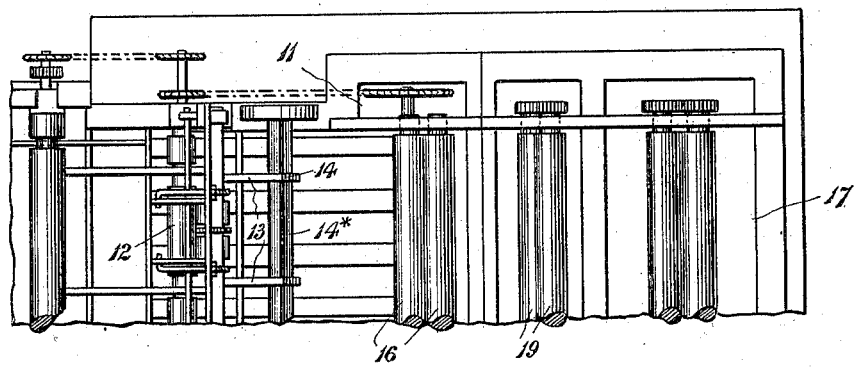

Figure 1 represents in side elevation the tin-pot of a continuous tinning machine, and Fig. 2 represents in plan a portion of the same.

The same reference numerals indicate the same parts in both figures of the drawing.

12, 12 are a pair of rolls at the entrance end of the tin-pot by the rotation of which the plates or sheets which are received wet from the swilling appliance of the continuous machine are delivered into the flux box at the entrance end of the tin-pot. The rolls 12, 12 are rotated at such a speed that the plates or sheets are carried by them more quickly through the flux on the surface of the molten tin in the tin-pot 11 than through any other portion of the tin-pot or grease pot in conjunction therewith. The plates or sheets. after they have passed through the rolls 12, 12 are urged forward through the tin-pot 11 by curved extensions 13 of radial arms 14 on the shaft 14* the curved extension 13 terminating in fingers 15 which engage with the rear edge of the plate or sheet until it is seized by the rolls 16, 16 by which it is transferred at a now slower speed to the soaking pot 17 a curved guide 18 (indicated in dotted lines only in Fig. 1) insuring the plate or sheet passing from the pair of rolls 16, 16 to the pair of rolls 19, 19 in the soaking pot 17. The plate or sheet is guided by curved guides such as are usual in the soaking pot to the first pair of rolls 20, 20.

We claim:—

1. In a machine for treating metallic plates or sheets, the combination of a tin-pot adapted to contain a bath of molten tin and a flux on the top of such bath at the entrance end of same, means for introducing the plates or sheets successively into the bath through the flux on the surface of the same at a speed faster than the plates or sheets travel through the finishing or grease pot rolls of the machine.

2. In a machine for treating metallic plates or sheets, the combination with a tin-pot adapted to contain a bath of molten tin and a flux on the surface of such bath at the entrance end of same, of means for introducing the plates or sheets successively into the bath through the said flux at a speed somewhat faster than the plates or sheets are carried through the outlet end of the tin-pot and grease pot.

In testimony whereof we have hereunto set our hands.

HUBERT SPENCE THOMAS.
WILLIAM ROBERT DAVIES.
RICHARD BEAUMONT THOMAS,
BY NORA CONSTANCE BEAUMONT THOMAS,
HENRY ROBERT WILLIAM ANDERSON,
CHARLES BATHURST,
*Executors of Richard Beaumont Thomas, deceased.*